(12) United States Patent
Edlinger

(10) Patent No.: US 6,251,160 B1
(45) Date of Patent: Jun. 26, 2001

(54) METHOD OF DE-CHROMING AND/OR DEPLETING THE MGO CONTENT OF STEEL SLAG

(75) Inventor: Alfred Edlinger, Baden (CH)

(73) Assignee: "Holderbank" Financiere Glarus AG, Glarus (CH)

( * ) Notice: Subject to any disclaimer, the term of this patent is extended or adjusted under 35 U.S.C. 154(b) by 0 days.

(21) Appl. No.: 09/297,185

(22) PCT Filed: Oct. 20, 1997

(86) PCT No.: PCT/AT97/00224

§ 371 Date: Apr. 23, 1999

§ 102(e) Date: Apr. 23, 1999

(87) PCT Pub. No.: WO98/17832

PCT Pub. Date: Apr. 30, 1998

(30) Foreign Application Priority Data

Oct. 23, 1996 (AT) ..................................... 1860/96
Nov. 29, 1996 (AT) ................................... 706/96 U

(51) Int. Cl.$^7$ ............................ C22B 7/04; C21B 3/04; C21B 3/06
(52) U.S. Cl. ............................ 75/434; 75/622; 75/623; 75/958; 65/19; 423/595
(58) Field of Search .......................... 75/434, 958, 622, 75/623; 65/19; 423/595

(56) References Cited

U.S. PATENT DOCUMENTS 3,106,447  * 10/1963  Charrat ................................. 75/958
5,501,721  *  3/1996  Edlinger ............................... 75/434
5,731,564  *  3/1998  Kujawa et al. ...................... 588/252
5,882,375  *  3/1999  Edlinger et al. ..................... 75/434

FOREIGN PATENT DOCUMENTS 1 047 702  12/1990  (CN) .
  619886   3/1949  (GB) .
96/34989  11/1996  (WO) .

OTHER PUBLICATIONS

Database WPI, Section Ch, Week 9320 Derwent Publications Ltd., London, GB; Class M24, AN 93–165430, XP002052373 & SU 1 735 408 A (Norilsk Mining Metal Combine), May 12, 1992.
Database WPI, Section Ch, Week 34 1979 Derwent Publications Ltd., London, GB; Class L02, AN 79–62179B, XP002052374 & JP 54 087 605 A (Kobe Steel Ltd), Jul. 12, 1979.
Database WPI, Section Ch, Week 7847 Derwent Publications Ltd., London, GB; Class M24, An 78–84650A, XP002052375 & JP 53 119 210 A (Kawasaki Steel Corp), Oct. 18, 1978.
Patent Abstracts of Japan vol. 096, No. 005, 3.Mai 1996 & JP 08 026791 A (Nippon Steel Corp), Jan. 30, 1996.
Patent Abstracts of Japan vol. 009, No. 108 (C–280), 11.Mai 1985 & JP 60 002605 A (Shin Nippon Seitetsu KK; Others: 01), Jan. 8, 1985.

* cited by examiner

*Primary Examiner*—Melvyn Andrews
(74) *Attorney, Agent, or Firm*—Pillsbury Winthrop LLP

(57) ABSTRACT

In a process for dechroming, and/or depleting the MgO content of, steel slags, oxygen is introduced into the liquid steel slag to an extent sufficient for converting iron quantitatively to iron oxide and at least 5% by weight of the iron oxide contained in the slag to iron-III-oxide. The oxidized slag obtained solidifies and is disintegrated, whereupon the paramagnetic portions formed are magnetically isolated and separated from the dechromed slag.

14 Claims, No Drawings

METHOD OF DE-CHROMING AND/OR DEPLETING THE MGO CONTENT OF STEEL SLAG

BACKGROUND OF THE INVENTION

1. Field of the Invention

The invention relates to a process for dechroming, and/or depleting the MgO content of, steel slags.

2. Description of Related Art

Slags used as starting products or fluxes in the production of cement have already been proposed several times. From U.S. Pat. No. 4,174,974 it is, for instance, known to react coal slag in the molten state with mineral substances and, in particular, calcium oxide, calcium hydroxide or calcium carbonate in order to produce clinker or cement in that manner. In the same U.S. Pat. No. 4,174,974, the use of blast furnace slag for comparable purposes has already been described. The admixture of slag into a rotary tubular kiln charged with kaolin, bauxite and lime has also been suggested.

Generally, the extensive use of steel slags as fluxes in the production of clinker and cement, is in conflict with the high content of metals different from iron contained in such steel slags. With the increasing use of scrap as a steel production prematerial, the portion of alloying metals in the steel slag has risen. In particular, a high content of chromium largely excludes the use of such slags as raw materials or fluxes. Due to the high toxicity of CrVI salts, only extremely slight amounts of CrVI are tolerated for construction materials.

Another disadvantage of the use of steel slags as fluxes in the production of clinker and cement resides in a usually high MgO content, which may amount to 10 to 15% by weight of the slag. In the hydration of cement, MgO is converted to Mg(OH)2 (brucite), whereby the compressive strength is strongly reduced on account of a volume expansion. For that reason, it is usually anticipated that the MgO content in clinker should not exceed 6% by weight.

SUMMARY OF THE INVENTION

The invention, therefore, aims at dechroming steel slags and/or reducing their MgO content in a simple way, thereby rendering the same apt for use in the production of cement clinker in a simple manner. To solve this object, the process according to the invention essentially resides in that oxygen is introduced into the liquid steel slag to an extent sufficient for converting iron quantitatively to iron oxide and at least 5% by weight of the iron oxide contained in the slag to iron-III-oxide, that the oxidized slag obtained solidifies and is disintegrated, whereupon the paramagnetic portions formed ("magnetite", $Fe_3O_4$) are magnetically isolated and separated from the dechromed slag. By the liquid steel slag being immediately refined on account of the introduction of oxygen, the residual iron contained in the steel slag, on the one hand, is quantitatively oxidized such that subsequent disintegration, for instance, by granulation in water or by using vapour may be effected without any risk. By the fact that not only the remaining iron is oxidized to iron oxide, but the iron oxide present in the steel slag as iron-II-oxide is additionally converted to iron-III-oxide at least partially, a spinel phase is formed, into which chromium is incorporated almost quantitatively during crystallization. During the solidification of such a steel slag derivative partially oxidized to iron-III, a defined minimum portion of magnetite is thus formed, into whose spinel structure chromium is quantitatively incorporated. On account of its paramagnetic properties, the iron-III-oxide may readily be magnetically separated after disintegration such that a steel slag freed from chromium and no longer containing free iron will be obtained following the magnetic separator. Surprisingly, it was found that beside $Cr_2O_3$, MgO is also incorporated in magnetite to a high degree such that the MgO content may be substantially reduced at the same time by magnetic separation of the magnetite. In case of vanadium-oxide-containing slags it was found that even vanadium is incorporated in the spinel structure to a largely quantitative extent so as to effect enrichment, thus allowing for economic recovery. Such a purified dechromed steel slag derivative is suitable as a charging material for the production of clinker without having to fear too high of a chromate content in the clinker or in cement produced therefrom.

Advantageously, the process according to the invention is carried out in that oxygen is blown into the liquid slag in the form of air and/or pure oxygen. Since liquid slag is charged, such a purification step may be carried out directly in the steel works following steel production while simultaneously obtaining a spinel phase suitable as a starting product for the production of ferrochromium.

According to a preferred further development of the process of the invention, it is proceeded in a manner that oxidation is carried out until the formation of an $Fe_3O_4$ content of the slag ranging between 5 and 20% by weight. Thereby, it is ensured that chromium can be magnetically separated quantitatively, since it is quantitatively in-corporated into the spinel structure of the magnetite.

Bearing in mind the fact that an iron-free product is obtained by refining the steel slag with oxygen or air, the slag may be granulated with water and/or vapor after oxidation without any risk, as in correspondence with a preferred further development of the process according to the invention. Metallic iron in that case would involve the risk of the formation of oxyhydrogen gas and hence the risk of explosions.

In order to safeguard that chromium is quantitatively dissolved in the spinel phase, the process according to the invention advantageously is performed in a manner that the basicity of the steel slag is maintained at $CaO/SiO_2$ values greater than 2.5. Generally Steel slags, have basicities ranging between 2.5 and 4.8, CrVI being nearly insoluble in the calcium-silicate phase with basicities greater than 2.5 and collecting preferably in the spinel crystals. Due to the strong enrichment of chromium in the paramagnetic magnetite spinel phase, that phase may preferably be used as a raw material for the production of chromium after magnetic separation. The dechromed steel slag is suitable, in particular, for use in a rotary tubular kiln for the production of cement clinker.

Usual steel slag compositions may be taken from the Table below, wherein the numerical data are indicated in % by weight and the balance to 100% by weight is constituted by non-determined impurities.

| Sample | 1 | 2 | 3 | 4 | 5 | 6 | Average |
|---|---|---|---|---|---|---|---|
| $SiO_2$ | 14.92 | 13.80 | 13.26 | 13.26 | 14.44 | 13.91 | 13.93 |
| $Al_2O_3$ | 7.37 | 7.01 | 6.51 | 6.21 | 7.70 | 6.51 | 6.89 |
| FeO | 25.31 | 25.31 | 27.02 | 26.94 | 25.95 | 26.09 | 26.10 |
| CaO | 34.10 | 37.07 | 37.07 | 32.18 | 34.28 | 34.77 | 34.91 |
| MgO | 6.54 | 7.54 | 7.33 | 6.75 | 7.38 | 6.41 | 6.99 |
| $SO_3$ | 0.23 | 0.26 | 0.11 | 0.16 | 0.19 | 0.08 | 0.17 |
| $Cr_2O_3$ | 1.27 | 1.19 | 1.22 | 1.20 | 1.07 | 1.01 | 1.16 |

-continued

| Sample | 1 | 2 | 3 | 4 | 5 | 6 | Average |
|---|---|---|---|---|---|---|---|
| $Mn_2O_3$ | 7.00 | 6.63 | 6.17 | 6.54 | 6.62 | 6.54 | 6.58 |
| $Na_2O$ | 0.13 | 0.12 | 0.10 | 0.17 | 0.14 | 0.07 | 0.12 |
| $K_2O$ | 0.02 | 0.02 | 0.02 | 0.03 | 0.02 | 0.01 | 0.02 |
| ZnO | 0.07 | 0.13 | 0.02 | 0.02 | 0.02 | 0.01 | 0.05 |
| SrO | 0.04 | 0.04 | 0.02 | 0.04 | 0.04 | 0.04 | 0.04 |

From the usual steel slag compositions, it is readily apparent that a $Cr_2O_3$ content of an average of 1.16% by weight allows for the use of only slight amounts of steel slag in conventional clinker production. By carrying out the process according to the invention, the $Cr_2O_3$ content may be reduced to values far below the tolerated CrVI content contained in a clinker produced from such a prematerial. In the process according to the invention, the oxidized chromium is quantitatively incorporated in the magnetite and is insoluble in the mineral phase of the slag.

For carrying out magnetic separation, it is advantageous to appropriately disintegrage the slag, mechanical disintegration to particle sizes smaller than 5 cm being sufficient, in principle. The product screened from such a disintegrated oxidized slag may, thus, be immediately separated into a chromium-rich phase and a chromium-free phase by magnetic separation.

The thus produced slag product already exhibits good hydraulic properties and may substitute for the clinker portion in mixed cement by up to 35% without quality losses.

DETAILED DESCRIPTION OF EMBODIMENTS OF THE INVENTION

EXAMPLE 1

As the process aggregate served a typical secondary-metallurgical ladle, into which technical oxygen was injected via porous bottom flushing bricks. The combustion enthalpy of the iron or iron-II oxide occurring was sufficient to overcompensate the thermal losses of the "refining ladle" (radiation, convection). If refining is to be effected exclusively by means of air, energy in fuel form must be fed in addition. Air/$O_2$ mixtures may be used as well.

In the instant case, refining was effected by aid of technically pure oxygen.

| LD Slag Analysis | |
|---|---|
| Component | Portion (%) |
| $SiO_2$ | 13 |
| $Al_2O_3$ | 6 |
| FeO | 26 |
| CaO | 34 |
| MgO | 4 |
| $SO_3$ | 0.2 |
| $Cr_2O_3$ | 2 |
| MnO | 7 |
| $Na_2O$ | 0.1 |
| $K_2O$ | 0.5 |
| $(Fe)_{met}$ | 7 |
| Balance usual impurities | |

Oxygen was blown into the 1580° C. hot highly liquid steel slag through bottom flushing bricks. The oxygen reacted quickly and quantitatively with the iron species.

Oxygen Balance for 1 Ton Steel Slag:

In order to oxidize the 70 kg (Fe)met of the LD slag to 90 kg FeO, 20 kg O2 are required. Thus, the FeO content of the LD slag rises to about 35%.

10%, or 35 kg, FeO is further oxidized to 39 kg $Fe_2O_3$ by aid of 4 kg O2.

These 39 kg $Fe_2O_3$ react with 18 kg FeO to form 57 kg $Fe_3O_4$ (magnetite). Chromium is incorporated into this magnetite in the form of spinels practically quantitatively (mixed spinel: $FeCr_2O_4 \times Fe_3O_4$). The spinel already separates from the slag melt and in part may already be removed from the slag melt by sedimentation.

The quantitative spinel composition is apparent from the following Table:

| Component | Portion (%) |
|---|---|
| Fe | 53 |
| Cr | 17 |
| O (oxygen) | 30 |

After solidification and disintegration, the spinel fraction was magnetically separated. That spinel constitutes a high-quality chromium ore and may be converted to high-grade ferro-chromium (carburé) by conventional reduction.

| FeCr % | |
|---|---|
| Fe | 76 |
| Cr | 24 |

After this, the remaining slag melt most advantageously may be vapor-granulated, having a residual chromium content of about 500 ppm Cr (in the remaining magnetite that has not sedimented out). This material already exhibits good hydraulic properties.

EXAMPLE 2

In an analogous manner, a slag having the following analysis was refined:

| Analysis (%) | |
|---|---|
| $SiO_2$ | 9.5 |
| CaO | 44.6 |
| MgO | 7.4 |
| $Al_2O_3$ | 0.6 |
| NnO | 6.7 |
| $TiO_2$ | 0.3 |
| $Cr_2O_3$ | 1.4 |
| $SO_3$ | 0.2 |
| $Na_2O$ | 0.1 |
| FeO | 28.7 |
| Total | 99.5 |
| Balance usual impurities | |

This slag was practically free of metallic iron and highly liquid at 1480° C. The oxygen fed from below the slag bath caused intense stiffening of the slag due to the formation of magnetite (spinel).

The magnetite (spinel) was magneticaly removed from the cooled oxide. The magnetite served the enrichment of MnO, MgO, $Al_2O_3$, $Cr_2O_3$, FeO/$Fe_2O_3$.

The "mineral phase", which constitutes a charging material for the cement industry, had the following composition:

| Mineral Phase (%) | |
| --- | --- |
| SiO$_2$ | 13 |
| CaO | 72 |
| FeO | 9 |

The balance consisted of traces of MgO (<2%), MnO, TiO$_2$, Cr$_2$O$_3$ (<500 ppm), SO$_2$, Na$_2$O. The spinel formed was composed as follows:

| Spinel | |
| --- | --- |
| Mg | 12% by weight |
| Al | 1% by weight |
| Mn | 14% by weight |
| Cr | 3% by weight |
| Fe | 42% by weight |
| O | 28% by weight |

In case vanadium was incorporated from the slag into the spinel, it may be recovered in a conventional manner by carbon-free reduction, for instance by reduction with aluminium, enrichments of about 3% by weight in the spinel having been observed with ordinary steel slags. Flushing in that case must not be effected by means of N$_2$ in order to prevent the formation of nitrites.

What is claimed is:

1. A process for dechroming steel slags and/or depleting the steel slags from MgO content, said process comprising:
   introducing an effective amount of oxygen into a liquid steel slag to convert iron of the liquid steel slag quantitatively into iron oxide and form an oxidized slag, with at least 5% by weight of the iron oxide being converted to iron-III-oxide;
   solidifying and disintegrating the oxidized slag; and
   magnetically isolating and separating paramagnetic portions of the oxidized slag to provide a dechromed slag.

2. A process according to claim 1, wherein said introducing of an effective amount of oxygen comprises blowing at least one member selected from the group consisting of air and pure oxygen into the liquid steel slag.

3. A process according to claim 1, wherein said introducing of an effective amount of oxygen is carried out until the oxidized slag contains 5% to 20% by weight of Fe$_3$O$_4$.

4. A process according to claim 2, wherein said introducing of an effective amount of oxygen is carried out until the oxidized slag contains 5% to 20% by weight of Fe$_3$O$_4$.

5. A process according to claim 1, further comprising granulating the oxidic slag with at least one member selected from the group consisting of water and vapor after said introducing of an effective amount of oxygen.

6. A process according to claim 1, further comprising maintaining the liquid steel slag at a basicity value CaO/SiO$_2$ greater than 2.5.

7. A process according to claim 2, further comprising maintaining the liquid steel slag at a basicity value CaO/SiO$_2$ greater than 2.5.

8. A process according to claim 3, further comprising maintaining the liquid steel slag at a basicity value CaO/SiO$_2$ greater than 2.5.

9. A process according to claim 1, wherein the paramagnetic portions comprise paramagnetic magnetite spinel phase, and wherein said process further comprises producing chromium from the paramagnetic magnetite spinel phase.

10. A process according to claim 1, further comprising charging the dechromed slag into a rotary tubular kiln, and producing cement clinker from the dechromed slag.

11. A process according to claim 2, further comprising charging the dechromed slag into a rotary tubular kiln, and producing cement clinker from the dechromed slag.

12. A process according to claim 3, further comprising charging the dechromed slag into a rotary tubular kiln, and producing cement clinker from the dechromed slag.

13. A process according to claim 1, further comprising recovering vanadium oxide incorporated in the paramagnetic portions by carbon-free reduction.

14. A process according to claim 13 further comprising performing the carbon-free reduction with aluminum.

* * * * *